United States Patent
Baisley et al.

(10) Patent No.: US 6,415,299 B1
(45) Date of Patent: Jul. 2, 2002

(54) METHOD FOR MERGING VERSIONS OF A MODEL IN AN OBJECT ORIENTED REPOSITORY

(75) Inventors: Donald Edward Baisley, Laguna Hills; Peter Johnson, Foothill Ranch, both of CA (US)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 09/547,642

(22) Filed: Apr. 12, 2000

(51) Int. Cl.$^7$ .............................................. G06F 17/30
(52) U.S. Cl. ..................... 707/203; 707/103; 707/101
(58) Field of Search ................................ 707/203, 100, 707/101, 102, 103, 104, 200, 201, 202, 3, 511; 703/22

(56) References Cited

U.S. PATENT DOCUMENTS

| | | | |
|---|---|---|---|
| 4,853,843 A | * 8/1989 | Ecklund | ...................... 707/203 |
| 5,317,729 A | * 5/1994 | Mukherjee et al. | ............ 707/3 |
| 6,088,706 A | * 7/2000 | Hild | ............................ 707/202 |
| 6,216,140 B1 | * 4/2001 | Kramer | ...................... 707/511 |
| 6,275,787 B1 | * 8/2001 | Baisley | ......................... 703/22 |

* cited by examiner

*Primary Examiner*—Sanjiv Shah
(74) *Attorney, Agent, or Firm*—Alfred W. Kozak; Mark T. Starr; Lise A. Rode

(57) ABSTRACT

A computer-implemented method is provided for merging a source version into a target version of a model in an object oriented repository. The method comprises the steps of building a first list as a collection of versions that occur only in a history of the source version; and, building a second list as a collection of versions that occur only in a history of the target version. Next, a dual history is created as a union of the first and second lists. After this, either the first or the second list is identified as the non-preferred history wherein either the source or the target version is preferred. The first list is then added to the history of the target version. Any conflicts occurring in the dual history are next reported; and, such conflicts are resolved by adding the target version to a list of end versions on each conflicting attribute value and link occurring in the non-preferred history.

20 Claims, 8 Drawing Sheets

METHOD FOR MERGING VERSIONS OF A MODEL IN AN OBJECT ORIENTED REPOSITORY

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates in general to the field of object-oriented programming and in particular to a method for readily performing merge operations on versions of a model stored in an object oriented repository and resolving conflicts between versions of the model.

BACKGROUND OF THE INVENTION

With the advent of repositories, improvements in the accessibility of data within databases and modeling with such data has improved. However, as repositories have become larger and more complex a method is required for defining, tracking and maintaining objects, models and versions thereof in an object oriented repository.

The storage and manipulation of data records or objects within a repository is well known in the prior art. A repository allows one to store information in it and to perform object modeling. A repository version service enables users to record changes to objects within the model over time and thus to maintain information about the previous states of these objects. Each of these states is maintained in a separate object in the repository. As the repository is used over time the number of evolutionary states of a versionable object increases. Thus, it becomes more and more difficult to track objects within the version tree as the number of historical states of the model increases. For example, at some point in time a variant branch is created. Over time multiple historical states and later sub-variant branches from this branch are created. Consequently, the version tree becomes more and more complex, which increases the complexity of later merging all branches into a versioned model.

A prior art method that maintains the complete state of the latest version of each object and then maintains partial objects for earlier versions of each object is taught in U.S. Pat. No. 5,347,653 entitled SYSTEM FOR RECONSTRUCTING PRIOR VERSIONS OF INDEXES USING RECORDS INDICATING CHANGES BETWEEN SUCCESSIVE VERSIONS OF THE INDEX by Rex A. Flynn, et al. Like other prior art versioning methods, there is more overhead involved in viewing historical states of objects. Moreover, this prior art method applies a version graph to an individual object rather than to a model as taught by the inventors hereof.

One of the aspects of a versioning service is the ability to handle parallel lines of development. For example, a new branch is made from an original branch and development continues along both the original branch and the new branch. At some point in time it is desirable to merge the new branch with a later version of the original branch. The present invention addresses this merge operation and the resolution of any conflicts where the same object or link is modified in both the original branch and the new branch.

SUMMARY OF THE INVENTION

Accordingly, it is an object of the present invention to provide a method of merging separate version branches of a model into a single new version.

Another object of the present invention is to provide a method for resolving any conflicts where the same object or link is modified in both the original branch and the new branch.

An advantage of the present invention is that merging can be performed expeditiously. Unlike current approaches to merging models, the present invention does not require full comparison of all objects, attribute values, and links of the versions being merged.

These and other objects and advantages, which will become apparent as the invention is described in detail below, are provided by a computer-implemented method wherein a source version is to be merged into a target version of a model in an object oriented repository. The method comprises the steps of building a first list as a collection of versions that occur only in a history of the source version; and, building a second list as a collection of versions that occur only in a history of the target version. Next, a dual history is created as a union of the first and second lists. After this, either the first or the second list is identified as the non-preferred history wherein either the source or the target version is preferred. The first list is then added to the history of the target version. Any conflicts occurring in the dual history are next reported; and, such conflicts are resolved by adding the target version to a list of end versions on each conflicting attribute value and link occurring in the non-preferred history.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Figure 1:
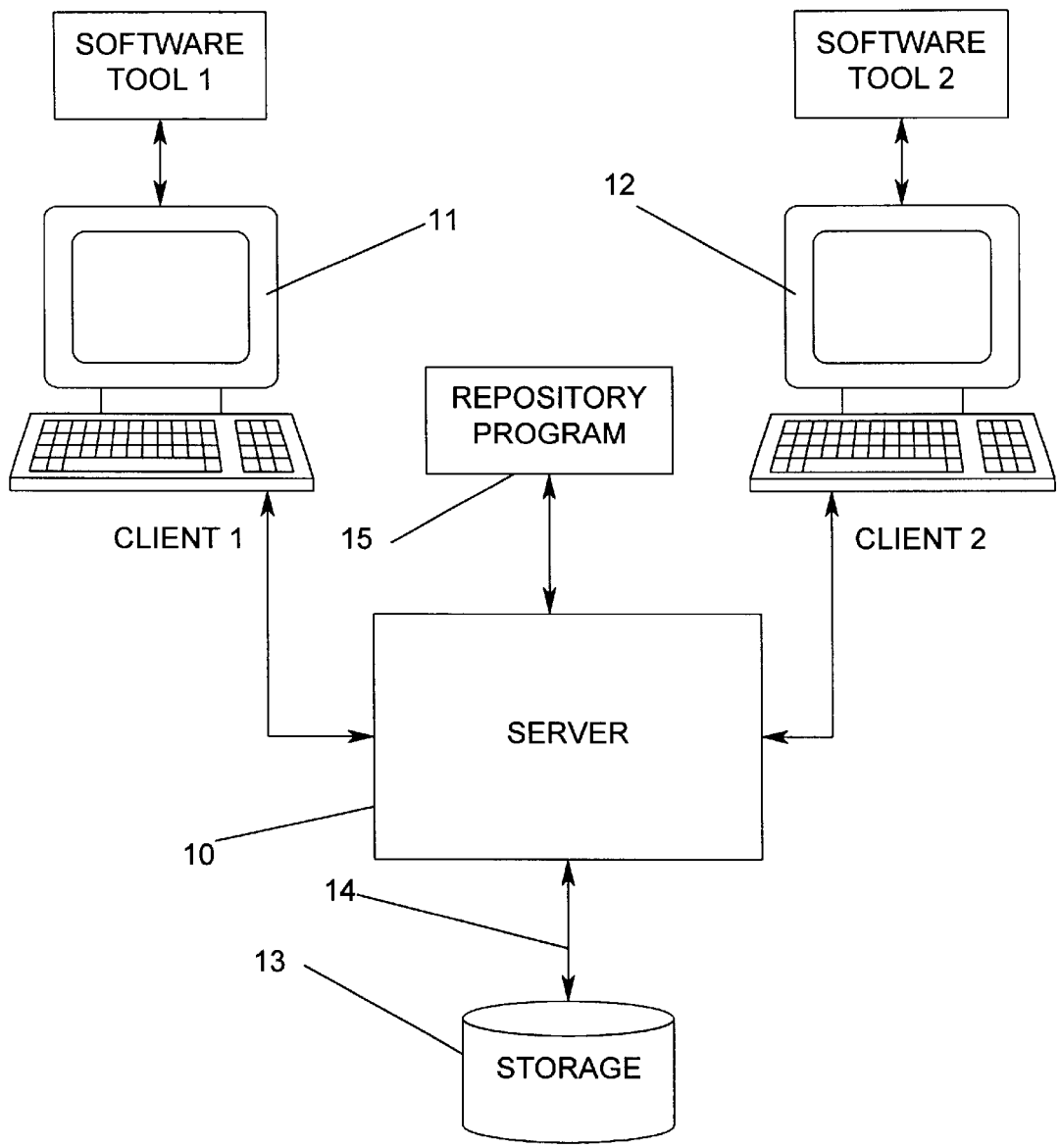
FIG. 1 is a block diagram of a computing system that may employ the method of the present invention.

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, each of which can be either an operation or a structural feature. An operation defines an action that an object can perform, or an action that can be performed on the object. For example, "make withdrawal" could be defined as an operation on a customer account object. Structural features indicate the state of an object. Structural features of an object have values, and these values define the state of the object. A structural feature can be either an attribute or a reference. An attribute defines a value that is maintained by the object. For example, "current account balance" could be an attribute of the customer account object. The numeric value for the customer's account balance would be stored in the customer account object. Attributes can be either instance-level or classifier-level. If instance-level, an attribute has separate values for each object in a class. If it is a classifier-level, an attribute has the same values for all members of the class, so it applies once for an entire model rather than separately to each object. A reference is a feature of an object, which relates the object to another object through a link. A link associates two objects. A reference represents a link within the objects it connects. There can be a reference on either end of a link, on both ends, or on neither end. As an example, a link would be used to connect an account object to a separate customer object. The account object could then contain a reference to the customer object, and the customer object could contain a reference to the account object. Some associations define composition, which mean that a link creates an ownership relationship such that one object owns the other.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

A version is an object that can be thought of in two ways. First, a version is a view of a model's state: i.e., what versioned objects exist and what are the values of their structural features? This can be a frozen historical state or a current, or active state. Second, a version can be thought of as a set of changes that create a new state from a previous one. The set of changes can be small or large; or, it can involve a single object or a great number of objects.

A version graph is a model of interrelated versions starting with an initial version, which then links to successive versions either directly or through branches that create alternate paths of modification to the versioned model. The term element as used herein with the phrase within an XML element shall mean all those code terms between brackets as defined by the rules of XML.

Versioning is orthogonal to the metamodels of information that can be versioned. For example, the standard UML metamodel does not address versioning. UML can be deployed in a repository with or without versioning. UML's structure, constraints and methods are the same regardless of versioning.

An object does not change its identity across versions, but its structural features can change. For example, suppose a UML UseCase is created with the name "Correct". In a later version its name is changed to "Revise". The same object exists in both versions. With respect to the later version, asking for the object's name is answered with "Revise". With respect to the earlier version, asking for the same object's name is answered with "Correct". With respect to a version that precedes creation of the UseCase, the object does not exist (as if it had been deleted).

The versioned states of a model include information relating each object, link, and attribute value to the version in which it is created or established, and to the zero of more versions in which it is deleted or removed. A single object, link or attribute value can be deleted or removed in multiple versions because a version graph can support branching. For example, an object created on one version can continue to exist in some branches of the version graph while being deleted in others.

Referring now to the drawings and FIG. 1 in particular, a block diagram of a system that may execute the method of the present invention is shown. A server computing system 10 is illustrated with a workstation 11 (such as Client 1) and a workstation 12 (such as Client 2) being coupled to the server. It is pointed out that many more workstations may also be coupled to the server 10, and a variety of different networks may be used for this coupling. The server 10 may also include a storage 13 coupled in a conventional manner by means of cabling 14. The storage 13 may be used for storing data useful to the programs being run in the workstations and to the server itself. The workstation 11 may be executing a software modeling tool 1, while the workstation 12 may be executing another or completely different software modeling tool 2. Moreover, the server 10 is capable of executing a repository software program 15.

The repository program 15 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, A METHOD FOR MAPPING TYPES IN A MODEL IN A OBJECT-ORIENTED REPOSITORY TO LANGUAGE CONSTRUCTS FOR A C BINDING FOR THE REPOSITORY; U.S. Pat. No. 5,721,925, for METHOD FOR GENERICALLY INVOKING OPERATIONS IN AN OBJECT ORIENTED REPOSITORY; U.S. Pat. No. 5,848,273, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; pending application Ser. No. 08/655,553, now U.S. Pat. No. 6,050,073 filed on May 30, 1996, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
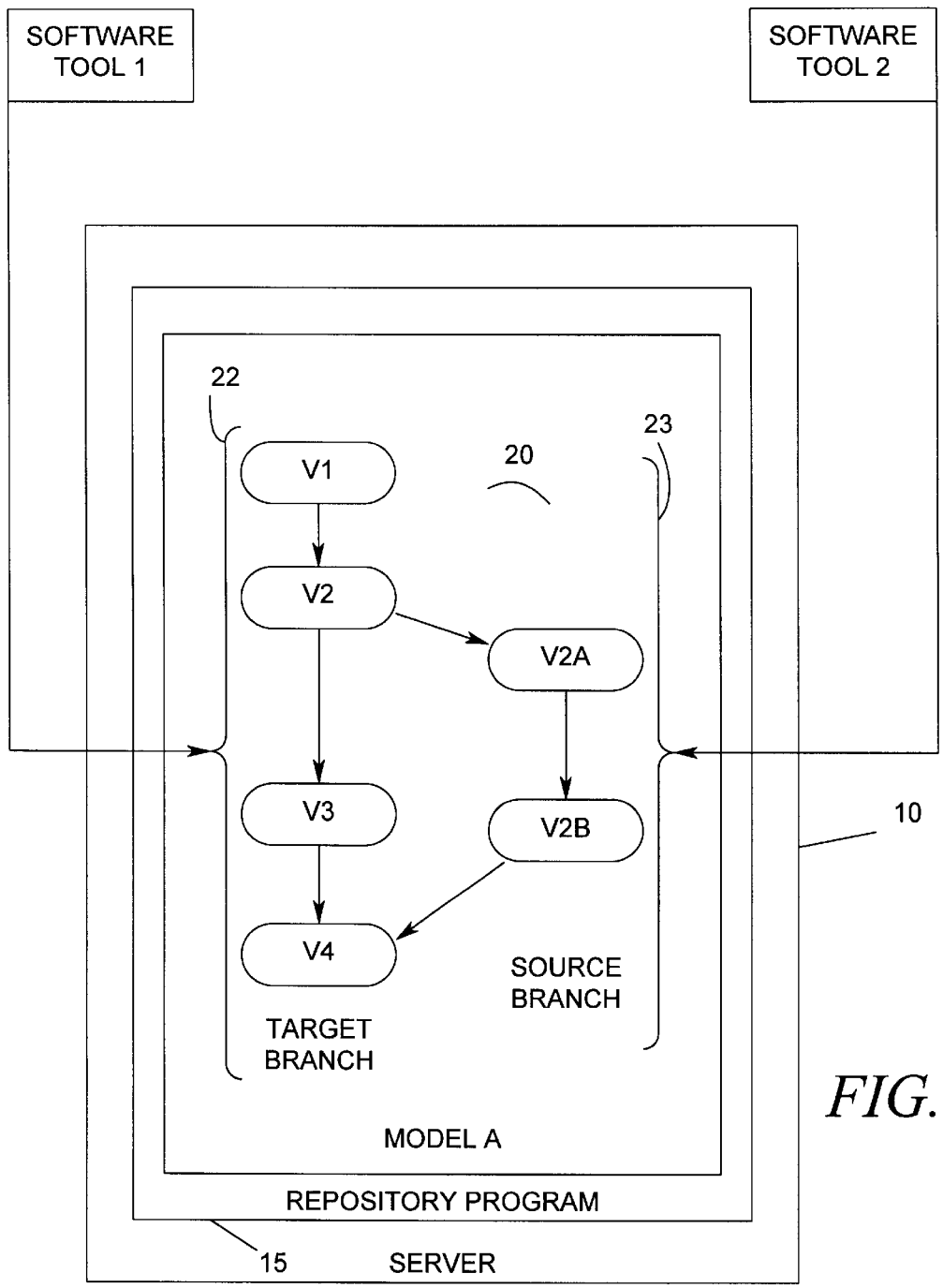
FIG. 2 is a block diagram illustrating the modules of the method of the present invention.

Referring now to FIG. 2, a block diagram illustrating the modules of the method of the present invention is shown. The software tools 1 and 2 are shown acting upon a model 20 (or Model A) within the repository 15. In particular, the software tool 1 is acting upon a target branch (as outlined by a bracket 22) by making versions (V2, V3, V4, etc. to the original version V1) and the software tool 2 is acting upon a source branch (as outlined by a bracket 23) by making versions (V2A, V2B, etc. to the version V2). The version tree can be better understood with reference to FIG. 3 and the accompanying description.

Figure 3:
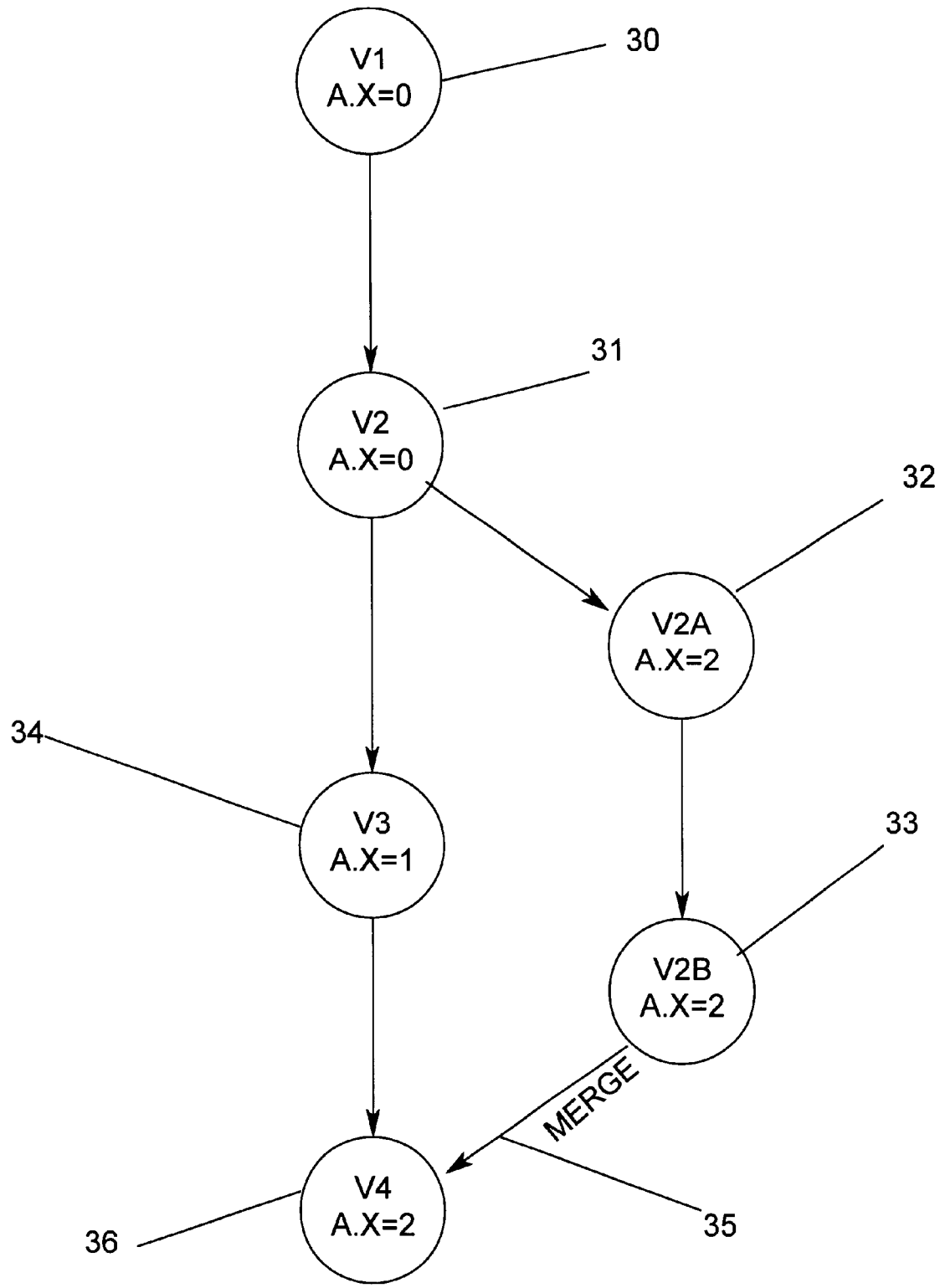
FIG. 3 is a diagram of a basic version tree, which illustrates the principle of merging as taught by the present invention.

Referring now to FIG. 3, a diagram of a basic version tree, which illustrates the principles of merging as taught by the present invention is shown. We start with a first model version 30 (or V1) where an attribute A.X=0 of the model. In the next model version 31 (or V2) the attribute A.X is still equal to zero. However in a new branch, model version 32 (or V2A) A.X is now set equal to 2 (A.X=2). Likewise, in model version 33 (or V2B) A.X is still equal to two. Back in the original branch, where parallel development is taking place, model version 34 (or V3) A.X is set equal to one (A.X=1). The changes taking place in the new branch (versions 32 and 33) are independent of the changes being made in the original branch (versions 31 and 34). The next operation is a merge operation as denoted by an arrow 35, which is to produce a version 36 (or V4). In performing the merge operation, all of the changes applied to objects and associations in versions 32 and 33 are applied to the objects and associations inversion 36, which is considered to be the "target" of the merge and version 33 is considered to be the source.

It is possible that a conflict may result if the same object or association is modified in both lines of development. Note that there is a conflict between model versions 33 and 34 where the attribute A.X=2 in model version 33 and A.X=1 in model version 34. The merge method of the present invention allows the user to specify if they want to keep the target value (version 34, A.X=1) or the source value (version 33, A.X=2). In any event, the method of this invention will report an attribute value conflict to the user for examination and resolution.

TABLE I below illustrates the conflict resolution, which may be made between versions 33 and 34. The first column represents the value of the parameter A.X; the second column represents the Start Version (the version in which the value is set); and the third column represents the End Version (the versions at which the value is no longer set).

TABLE I

|  | Start Version | End Version |
| --- | --- | --- |
| A.X= 0 | V1 | V3, V2A |
| A.X= 1 | V3 | V4 |
| A.X= 2 | V2A |  |

If the versions are merged without resolving the conflicting values of A.X, then A.X would end up with two values in version V4 (both A.X=1 and A.X=2). But based on the current invention and as shown in Table I, the value of A.X=2 in version V4, because A.X=1 is ended in V4 as a way to resolve the conflict in favor of A.X=2.

A conflict occurs where versions being merged have separately modified the same information. TABLE II below lists various conflict situations that can occur when versions are merged. Some of the situations listed are handled automatically and are not reported as conflicts. An argument to creating a Merge controls which of the source and target versions is given preference when conflicts occur.

Merging can cause constraint violations. In addition to handling a multiplicity overflow or multiple composite owners as described in TABLE II below, a merge does not automatically detect or resolve constraint violations. Violations can be found separately after merging by validating the target version of the model.

In column A of TABLE II, the Conflict Situation is noted; column B indicates the result as seen in the resulting merged version. An asterisk (*) in column C in indicates a situation that causes a change to be added to the target version's change set. The last column D is blank if no conflict is reported for the situation. Otherwise, the columns tell the kind of the conflict that is reported.

TABLE II

| A | B | C | D |
| --- | --- | --- | --- |
| An object is deleted from one version and its attribute is given a value in the other | The object remains deleted |  | Deleted Object Attribute |
| A single-valued attribute is set to different values | The value of the preferred version is kept, the value of other version is removed | * | Attribute Value |
| A single-valued attribute is unset in one version and set to a new value in the other version | The new value is retained |  |  |
| A single-valued attribute is set to the same value in each version | The value of the unpreferred version is removed to avoid having a redundant value | * |  |
| An object is deleted in one version and a link to the object is created in the other version | The object remains deleted, and the link is removed | * | Link End Deleted |
| The same unordered link is added by both versions, or the same ordered link is added in the same position | The link in the unpreferred version is removed | * |  |
| The same ordered link is added into different positions | The link in the unpreferred version is removed | * | Link Order |
| The combined links added by both versions cause a multiplicity overflow | Enough links are removed from the unpreferred version to prevent the overflow condition. If ordered, removal starts at the end | * | Link Overflow |

TABLE II-continued

| A | B | C | D |
|---|---|---|---|
| | of the unpreferred version's links | | |
| The combined changes of the versions after resolving other conflicts leaves an object with more than one refImmediate-Composite. | The composite link or attribute value in the unpreferred version is removed | * | Composition Overflow |

Figure 4:
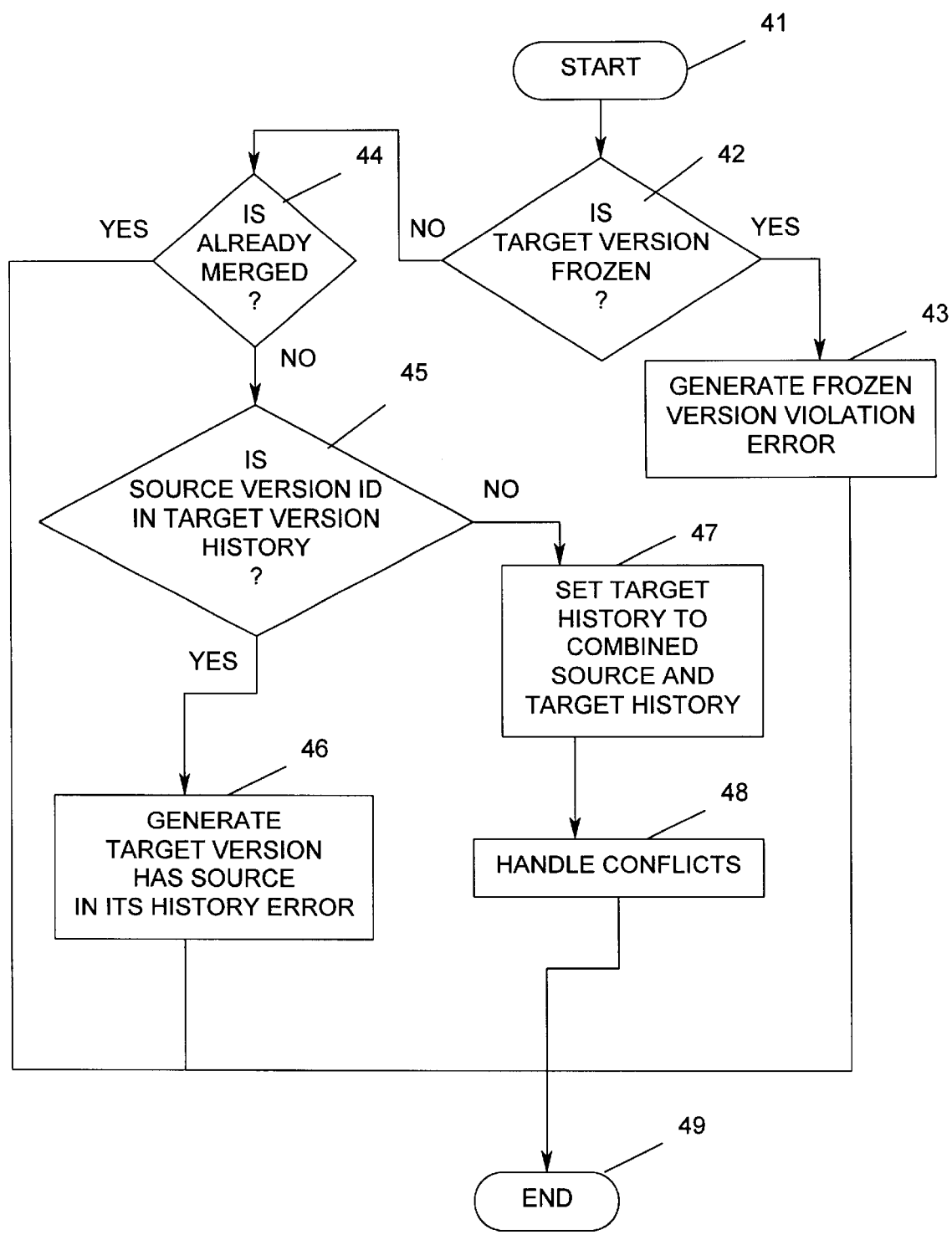
FIG. 4 is a flow chart illustrating the overall process for the present invention.

With reference to FIG. 4, a flow chart illustrating the overall process of the present invention is shown. In particular, this chart illustrates the steps performed by a computing system for merging a source version on one branch into a target version on another branch. The process begins with a start bubble 41 followed by an inquiry as to whether or not the target version is frozen (diamond 42). If the target version is frozen, a FROZEN VERSION VIOLATION error is generated (block 43) and the process exits, as denoted by an end bubble 49. If the target version is not frozen, processing continues to determine if the source version has been previously merged into the target version (diamond 46). If the source version has been previously merged into the target version, then processing exits as denoted by the end bubble 49. On the other hand, if the source version has not been previously merged into the target version, then processing continues to determine if the source version id is already in the target version's history (diamond 45). If the source version id is already in the target version's history, then the source was previously merged into an ancestor version of the target version and the merge being requested is disallowed by generating a target version "HAS SOURCE IN ITS HISTORY" error (block 46), at which point processing exits as denoted by end bubble 49. If the source version id is not in the target version's history then processing continues with the version id that appears in the history of the source version being added to the history of the target version (block 47). At this point, the source version has been merged into the target version and the algorithms expressed in the versioning patent can be used to determine the existence of objects and associations and the values of the visible object's attributes and references. However, there is a possibility that some attribute values of associations will be in violation of constraints defined either by the MOF (i.e., Meta Object Facility) or by the model that defines the objects and associations. Accordingly, processing continues by handling those conflicts, as indicated by block 48, after which processing exits as denoted by the end bubble 49.

Figure 5A:
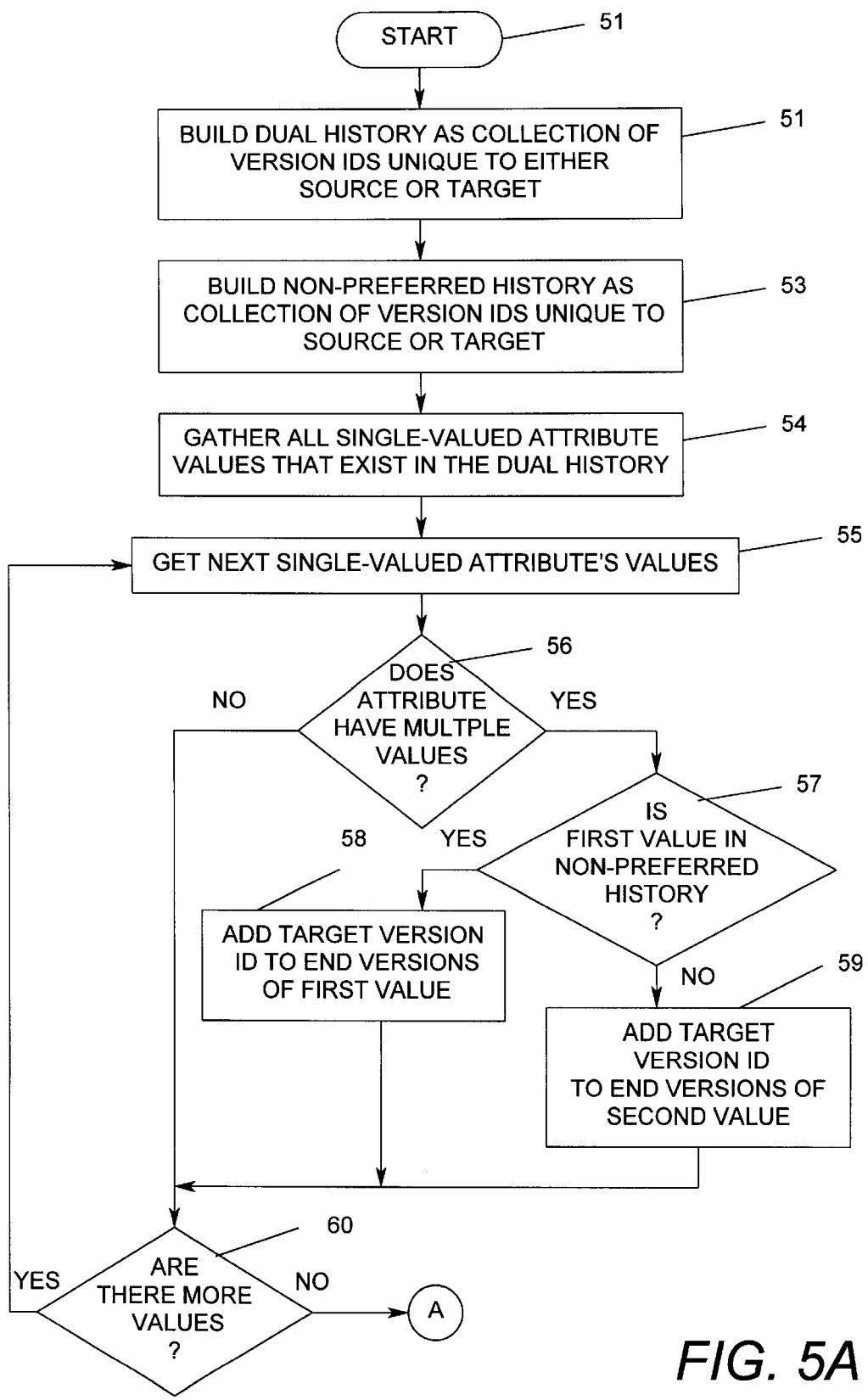
FIGS. 5A through 5D combined form a detailed flow chart illustrating the present invention.

Referring now to FIG. 5A, a flow chart illustrating the process for handling conflicts created by merging a source version on one branch into a target version on another branch is shown. The process begins with a start bubble 51 followed by a step of building a history that consists of the version ids of versions that are unique to the source or target version histories (block 52). This dual history will not contain any version ids that are common to the histories of both the target and source version histories, such as the root version which appears in all histories. Processing then continues by building another history that contains only those version ids unique to the non-preferred version (block 53). If the source version is the non-preferred, version then the non-preferred history will contain version ids for versions that appear in the history of the source version but not in the history of the target version. If the target version is the non-preferred version, then the non-preferred history will contain version ids for versions that appear in the history of the target version, but not in the history of the source version. Processing then continues by gathering all of the values of attribute that are defined in the model as being single valued (block 54). If a single-valued attribute value was modified on both branches, then there exists the possibility that that attribute will now have two values. Such values will exist only in the context of the dual history. One of those values must be deleted. Processing continues by getting the next attribute values gathered (block 55) and then determining if the attribute contains multiple values (diamond 56). If the attribute does not contain multiple values, then processing continues with diamond 60, which determines if there are any more attribute values to examine. If the attribute does contain multiple values, then processing continues with diamond 57, which determines if the first property value exists in the non-preferred history. If the first property value exists in the non-preferred history, then processing continues by adding the target version id to the end versions of the first value (block 58), thus logically deleting that value within the target version. If the first property value does not exist in the non-preferred history, then processing continues by adding the target version id to the end versions of the second value (block 59), thus logically deleting that value within the target version. Processing continues to determine if more attribute values need to be examined (diamond 60). If more attribute values remain to be examined, then a return is made back to the 55 for further processing. If no more attribute values remain to be examined, then processing continues on the next sheet of the drawings (FIG. 5B), as denoted by a connector A.

Figure 5B:
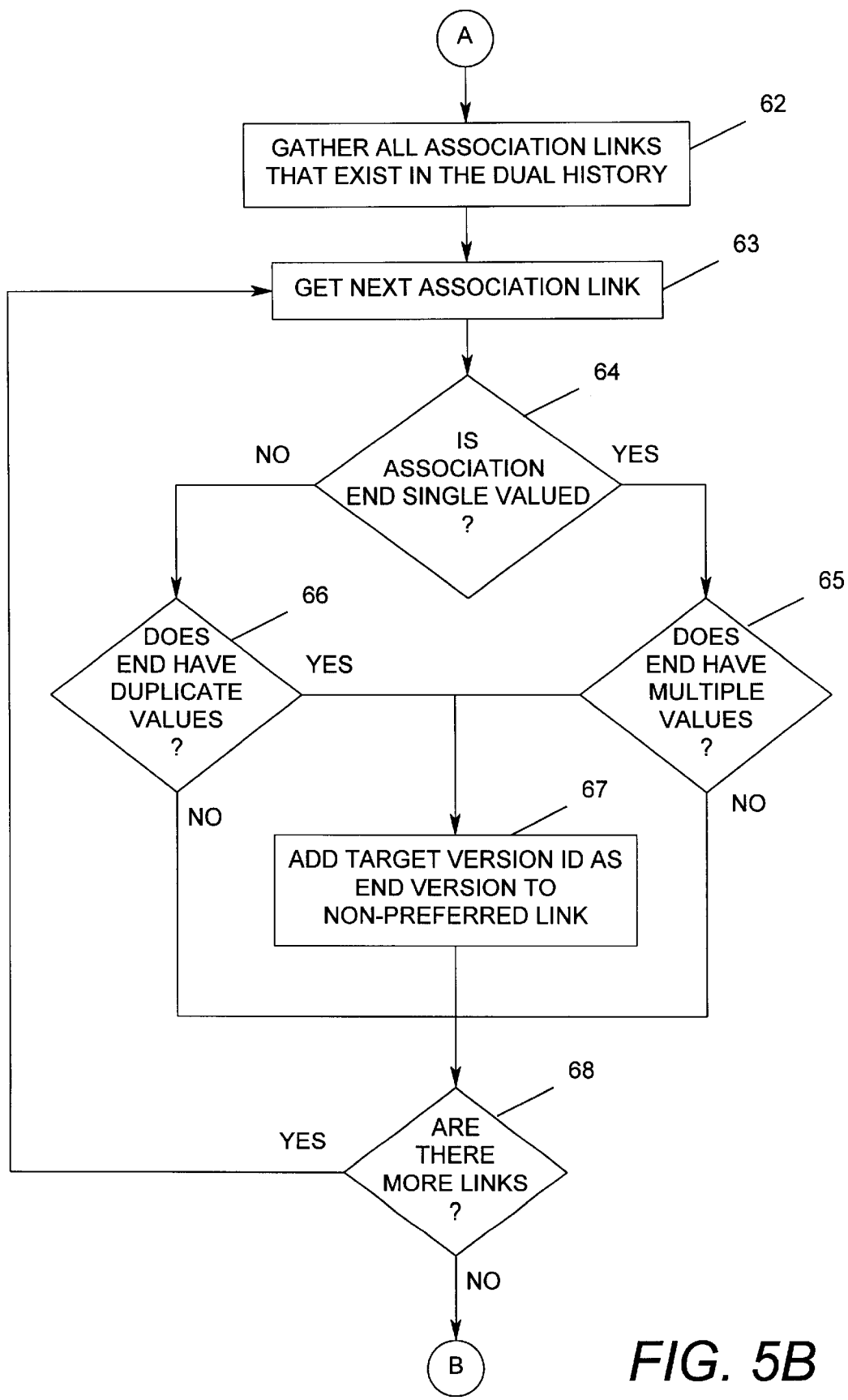

With reference to FIG. 5B at the connector A, the process continues by gathering all of the association links that exist in the context of the dual history (block 62). Next, the next association link is gathered (block 63) and then a determination is made as to whether or not the association end is defined in the model as being single-valued (diamond 64). If the association end is defined in the model as being single-valued, then processing continues to determine if the association end contains multiple values for the same object (diamond 65). If the association end contains multiple values for the same object, then processing continues by adding the target version id to the end versions of the non-preferred association end value (block 67). If the association end is not defined in the model as being single-valued, then processing continues to determine if the association end contains duplicate values for the same object (diamond 66). If the association end contains duplicate values for the same object, then processing continues by adding the target version id to the end versions of the non-preferred link (block 67). Next, a determination is made if there are any more association links to examine (diamond 68). If there are more association links to examine, then a return is made back to the block 63 for further processing. If there are no more association links to examine, processing continues in FIG. 5C as indicated by a connector B.

Figure 5C:
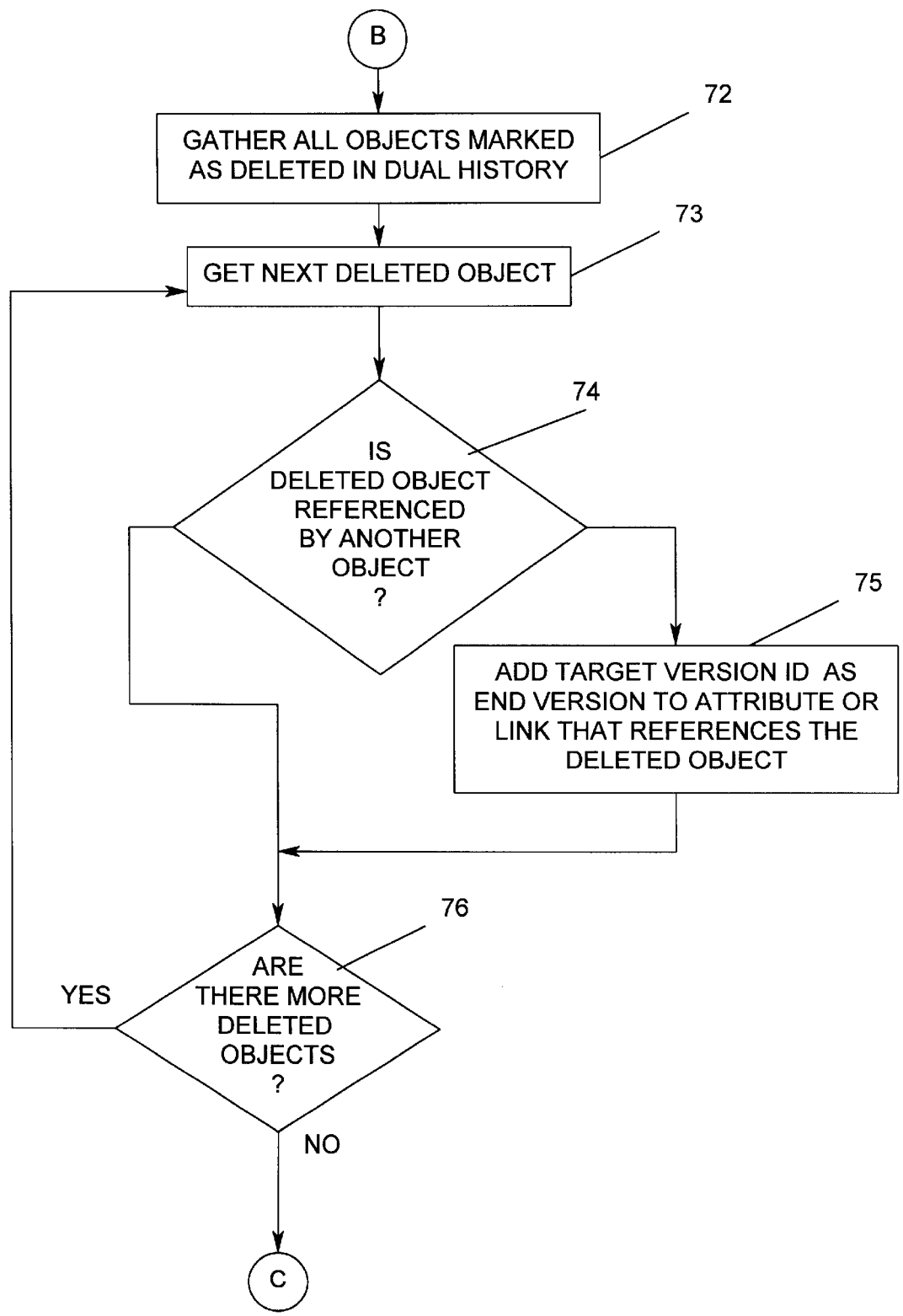

With reference to FIG. 5C at the connector B, the process continues by gathering all of the objects that were marked as deleted in the dual history (block 72). After this, the next deleted object is gathered (block 73) and then a determination is made if the object is referenced by another object within the context of the target version (diamond 74). If the deleted object is referenced by another object within the context of the target version, then the object-valued attribute value, or the association link that references the deleted object, has the version id of the target version added to its end versions (block 75). Next, a determination is made if there are any more deleted objects to examine (diamond 76). If there are more deleted objects to examine, a return is made back to the block 73. If there are no more deleted objects to examine, processing continues in the next figure as indicated by a connector C.

Figure 5D:
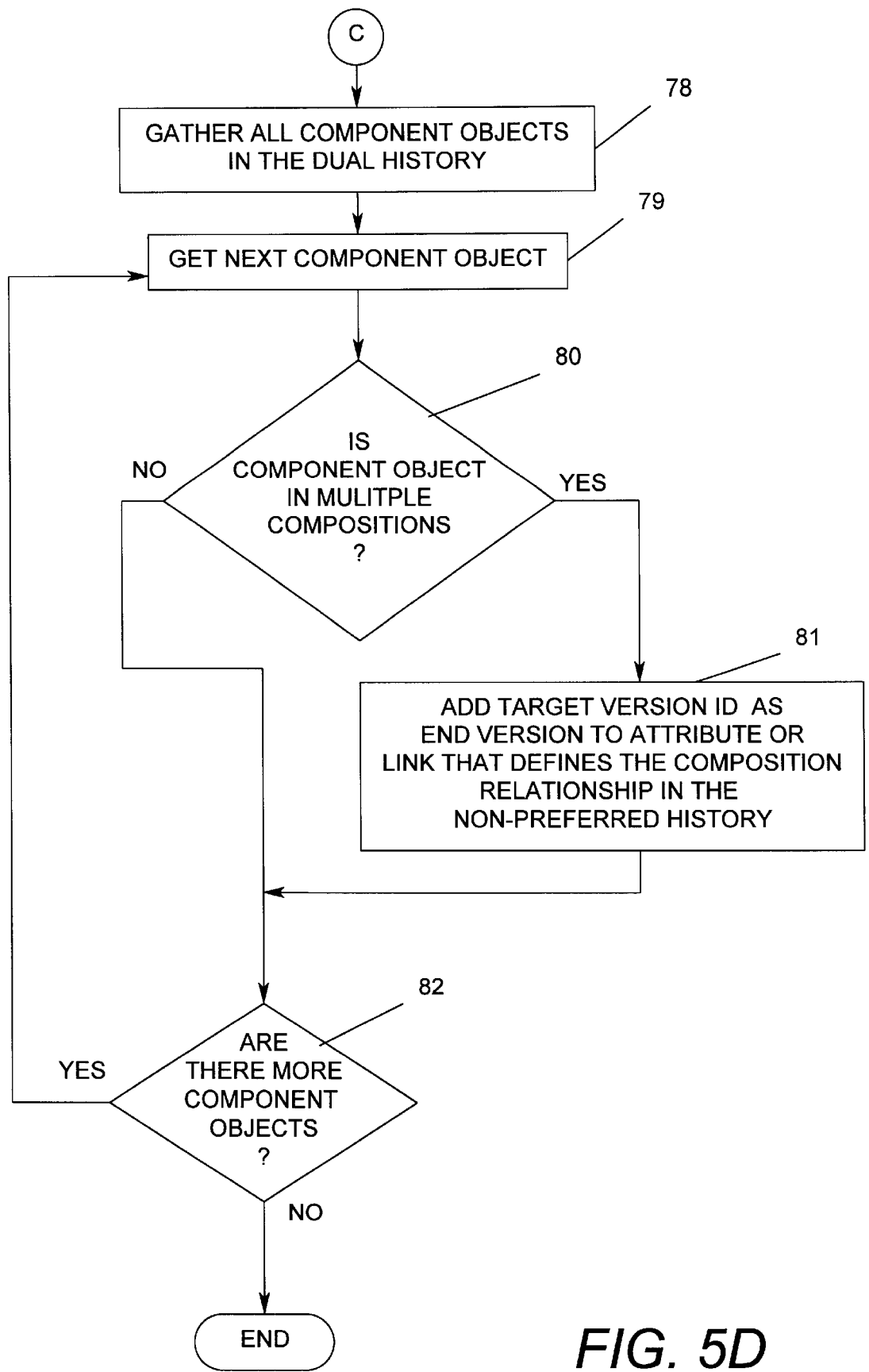

With reference to FIG. 5D at the connector C, the process continues by gathering all of the objects that are defined as being component objects in a composition relationship (block 78). Next, the component objects are gathered (block 79) and then a determination is made if a component object is in multiple compositions within the context of the target version (diamond 80). If the component object is in multiple compositions within the context of the target version, then the target version id is added as an end version to the attribute value or association link that defines the composition relationship that exists in the non-preferred history (block 81). After this, a determination is made if there are any more component objects to examine (diamond 82). If there are more component objects to examine, a return is made back to the block 79 for further processing. If there are no more component objects to examine, then the process exists as indicated by an end bubble 83.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. A computer-implemented method for merging a source version into a target version of a model in an object oriented repository, said method comprising the steps of:
   a. building a first list as a collection of versions that occur only in a history of said source version;
   b. building a second list as a collection of versions that occur only in a history of said target version;
   c. creating a dual history as a union of said first list and said second list;
   d. identifying said second list as non-preferred history wherein said source version is preferred;
   e. adding said first list to said history of said target version;
   f. reporting any conflicts occurring in said dual history; and,
   g. resolving said conflicts by adding said target version to a list of end versions on each conflicting attribute value and link occurring in said non-preferred history.

2. A computer-implemented method for merging a source version into a target version of a model in an object oriented repository, said method comprising the steps of:
   a. building a first list as a collection of versions that occur only in a history of said source version;
   b. building a second list as a collection of versions that occur only in a history of said target version;
   c. creating a dual history as a union of said first list and said second list;
   d. identifying said first list as non-preferred history wherein said target version is preferred;
   e. adding said first list to said history of said target version;
   f. reporting any conflicts occurring in said dual history; and,
   g. resolving said conflicts by adding said target version to a list of end versions on each conflicting attribute value and link occurring in said non-preferred history.

3. The method as in claim 1 or 2 where step g thereof further comprises for each single-valued attribute value that exists in said dual history the steps of:
   h. determining if said attribute has multiple values for same object, and if so;
   i. adding said target version to said list of end versions on said attribute value occurring in said non-preferred history.

4. The method as in claim 1 or 2 where step g thereof further comprises for each single-valued association end of each link that exists in said dual history the steps of:
   h. determining if said association end has multiple values for same object, and if so;
   i. adding said target version to said list of end versions on said link occurring in said non-preferred history.

5. The method as in claim 1 or 2 where step g thereof further comprises for each link that exists in said non-preferred history the steps of:
   h. determining if said link is a duplicate within said dual history, and if so;
   i. adding said target version to said list of end versions on said link occurring in said non-preferred history.

6. The method as in claim 1 or 2 where step g thereof further comprises, for each object marked as deleted in said dual history, the steps of:
   h. determining if said object is referenced as an attribute value within said dual history, and if so;
   i. adding said target version to said list of end versions on said attribute value.

7. The method as in claim 1 or 2 where step g thereof further comprises, for each object marked as deleted in said dual history, the steps of:
   h. determining if said object is referenced by a link occurring in said dual history, and if so;
   i. adding said target version to said list of end versions on said link.

8. The method as in claim 1 or 2 where step g thereof further comprises, for each component object in said dual history, the steps of:
   h. determining if said component object occurs in two compositions in said dual history, and if so;

i. adding said target version to said list of end versions on said composition occurring in said non-preferred history.

9. The method as in claim 8 wherein said composition is an attribute value.

10. The method as in claim 8 wherein said composition is an a link.

11. A storage medium encoded with machine-readable computer program code for merging a source version into a target version of a model in an object oriented repository, wherein, when the computer program code is executed by a computer, the computer performs the steps of:

a. building a first list as a collection of versions that occur only in a history of said source version;
   b. building a second list as a collection of versions that occur only in a history of said target version;
   c. creating a dual history as a union of said first list and said second list;
   d. identifying said second list as non-preferred history wherein said source version is preferred;
   e. adding said first list to said history of said target version;
   f. reporting any conflicts occurring in said dual history; and,
   g. resolving said conflicts by adding said target version to a list of end versions on each conflicting attribute value and link occurring in said non-preferred history.

12. A storage medium encoded with machine-readable computer program code for merging a source version into a target version of a model in an object oriented repository, wherein, when the computer program code is executed by a computer, the computer performs the steps of:

a. building a first list as a collection of versions that occur only in a history of said source version;
   b. building a second list as a collection of versions that occur only in a history of said target version;
   c. creating a dual history as a union of said first list and said second list;
   d. identifying said first list as non-preferred history wherein said target version is preferred;
   e. adding said first list to said history of said target version;
   f. reporting any conflicts occurring in said dual history; and,
   g. resolving said conflicts by adding said target version to a list of end versions on each conflicting attribute value and link occurring in said non-preferred history.

13. The storage medium as in claim 11 or 12 where step g thereof further comprises for each single-valued attribute value that exists in said dual history the steps of:

h. determining if said attribute has multiple values for same object, and if so;
   i. adding said target version to said list of end versions on said attribute value occurring in said non-preferred history.

14. The storage medium as in claim 11 or 12 where step g thereof further comprises for each single-valued association end of each link that exists in said dual history the steps of:

h. determining if said association end has multiple values for same object, and if so;
   i. adding said target version to said list of end versions on said link occurring in said non-preferred history.

15. The storage medium as in claim 11 or 12 where step g thereof further comprises for each link that exists in said non-preferred history the steps of:

h. determining if said link is a duplicate within said dual history, and if so;
   i. adding said target version to said list of end versions on said link occurring in said non-preferred history.

16. The storage medium as in claim 11 or 12 where step g thereof further comprises, for each object marked as deleted in said dual history, the steps of:

h. determining if said object is referenced as an attribute value within said dual history, and if so;
   i. adding said target version to said list of end versions on said attribute value.

17. The storage medium as in claim 11 or 12 where step g thereof further comprises, for each object marked as deleted in said dual history, the steps of:

h. determining if said object is referenced by a link occurring in said dual history, and if so;
   i. adding said target version to said list of end versions on said link.

18. The storage medium as in claim 11 or 12 where step g thereof further comprises, for each component object in said dual history, the steps of:

h. determining if said component object occurs in two compositions in said dual history, and if so;
   i. adding said target version to said list of end versions on said composition occurring in said non-preferred history.

19. The storage medium as in claim 18 wherein said composition is an attribute value.

20. The storage medium as in claim 18 wherein said composition is an a link.

* * * * *